United States Patent
Fenerli

[15] 3,635,148
[45] Jan. 18, 1972

[54] MACHINE FOR PROCESSING SPAGHETTI

[72] Inventor: Ligor Gregory Fenerli, 341 South Main St., Ann Arbor, Mich. 48108

[22] Filed: Oct. 29, 1969

[21] Appl. No.: 872,083

[52] U.S. Cl. .................................................. 99/404, 99/407
[51] Int. Cl. .......................................................... A47j 37/12
[58] Field of Search ............................................. 99/404, 407

[56] References Cited

UNITED STATES PATENTS

| | | | |
|---|---|---|---|
| 1,310,495 | 7/1919 | Ford | 99/404 |
| 2,614,485 | 10/1952 | Sinkwitz et al. | 99/404 |
| 3,296,954 | 1/1967 | Haub et al. | 99/404 |

*Primary Examiner*—William I. Price
*Attorney*—Olsen and Stephenson

[57] ABSTRACT

Apparatus for continuously converting precooked spaghetti to a fully cooked and sauced food product wherein a rotatable table has a plurality of work stations positioned around the periphery of the table. A plurality of baskets are movably supported on the table so that they project outwardly therefrom and are movable downwardly at certain stations for food processing and basket cleaning purposes and are inverted at an unload station where the final food product is dispensed. Basket supports on the table move with the table in a manner to provide for this selective up-and-down and inverting movement of the baskets.

4 Claims, 10 Drawing Figures

INVENTOR
LIGOR GREGORY FENERLI

BY
Olsen and Stephenson
ATTORNEYS

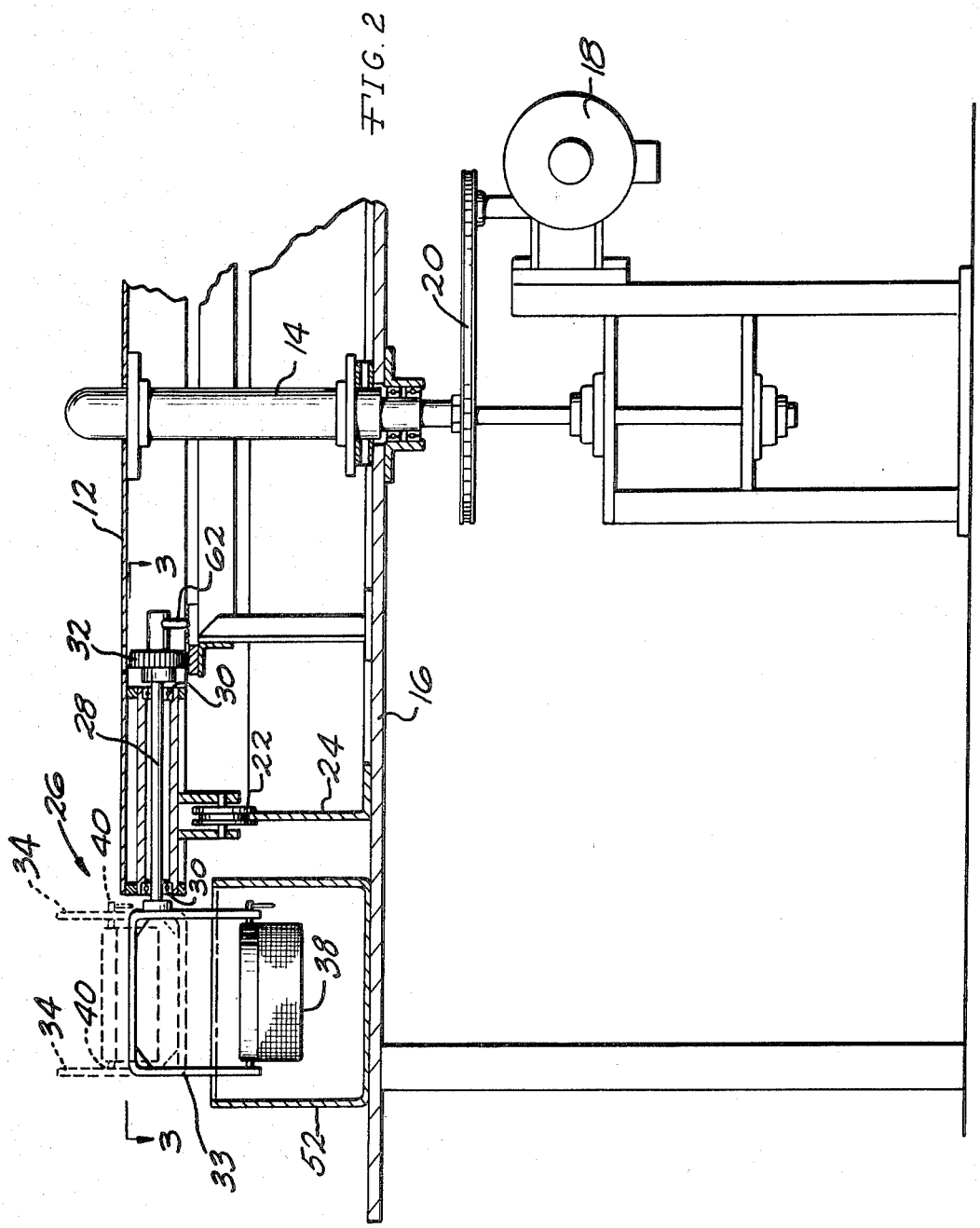

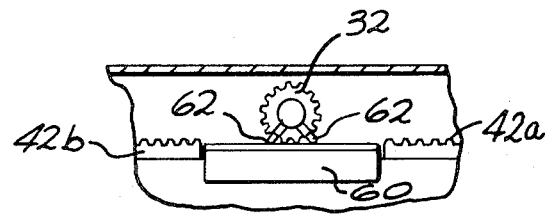
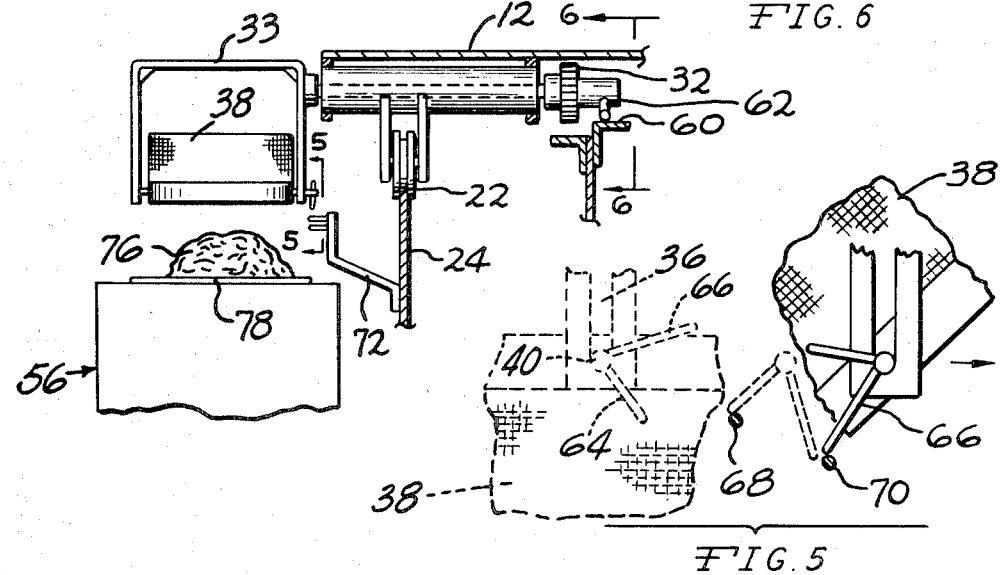
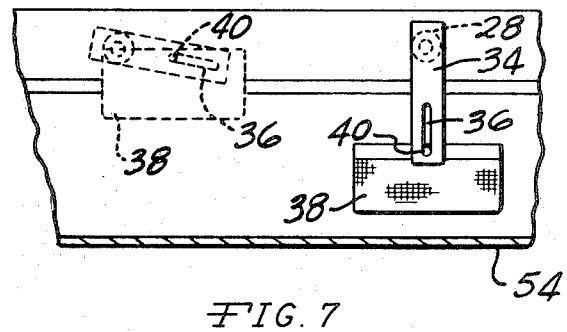
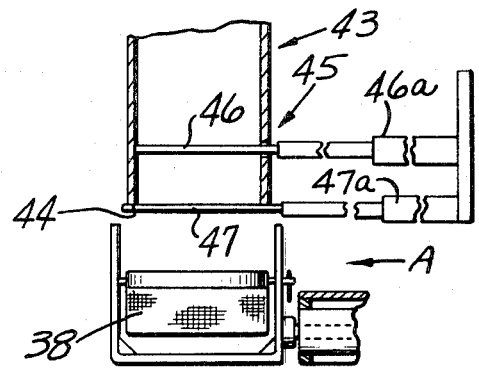
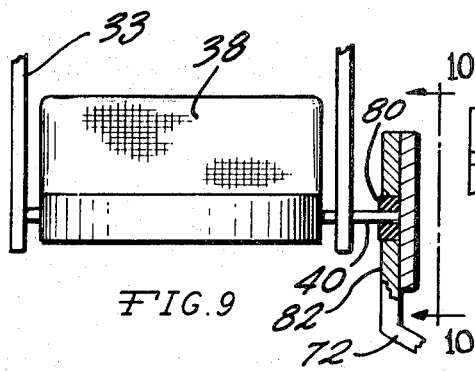
INVENTOR
LIGOR GREGORY FENERLI
BY
Olsen and Stephenson
ATTORNEYS

MACHINE FOR PROCESSING SPAGHETTI

This invention relates generally to food-processing apparatus and more particularly to apparatus for continuously processing uncooked or precooked raw material food product, such as precooked spaghetti, so that a final edible food product is obtained.

Apparatus for continuously processing spaghetti is desirable in order to eliminate the manual labor and costs involved in batch-processing single-serving amounts of spaghetti and to avoid the unsatisfactory results inherent in preparation of food products such as spaghetti which lose some of their flavor and succulence when prepared in advance. Accordingly, the apparatus of this invention provides a multistation processing table in which single-serving amounts of spaghetti can be continuously prepared. This enables continuous or intermittent dispensing of single-serving amounts of spaghetti for a takeout spaghetti house, for example.

The apparatus includes supports for perforate baskets which provide for up-and-down movement of the baskets at stations such as a final cook station, a sauce application station, and a basket cleaning station. Furthermore, the basket supports enable automatic inversion of the basket at the dispensing station where the final cooked product is removed from the apparatus. Accordingly, the apparatus of this invention includes a rotatable table which moves intermittently so that a basket supported thereon is moved first to a load station where a predetermined amount of precooked spaghetti is deposited therein, and then moved successively through a cook station where the basket contents are immersed in hot water, a hot-sauce station where the basket contents are immersed in spaghetti sauce, a drip station where excess sauce is removed from the spaghetti in the basket, a dispensing station where the basket is inverted and the spaghetti is removed therefrom, and a cleaning station where the basket is immersed in hot water. A pivotal support of the perforate basket on a support assembly which is selectively rotatable enables this desired movement of the basket.

Further objects, features and advantages of this invention will become apparent from a consideration of the following description, the appended claims, and the accompanying drawing in which:

FIG. 2 is an enlarged fragmentary sectional view of a portion of the apparatus of this invention as seen from substantially the line 2—2 in FIG. 1;

FIG. 4 is an enlarged fragmentary view of a portion of the apparatus of this invention at the release station, as seen from substantially the line 4—4 in FIG. 1;

FIG. 5 is a view at the release station showing the progressive inversion of the spaghetti-containing basket at the release station as viewed from substantially the line 5—5 in FIG. 4;

FIG. 6 is a fragmentary detail sectional view looking along the line 6—6 in FIG. 4;

FIG. 7 is a view from substantially the line 7—7 in FIG. 1 showing the progressive lowering of a basket at one of the stations of this invention;

FIG. 8 is an enlarged fragmentary sectional view at the load station in the apparatus of this invention, as seen from substantially the line 8—8 in FIG. 1;

FIG. 9 is a fragmentary sectional view of a portion of the apparatus of this invention at the release station, showing a modified form of basket-inverting mechanism; and FIG. 10 is a detail view of the mechanism shown in FIG. 9, as seen from substantially the line 10—10 in FIG. 9.

Figure 1:
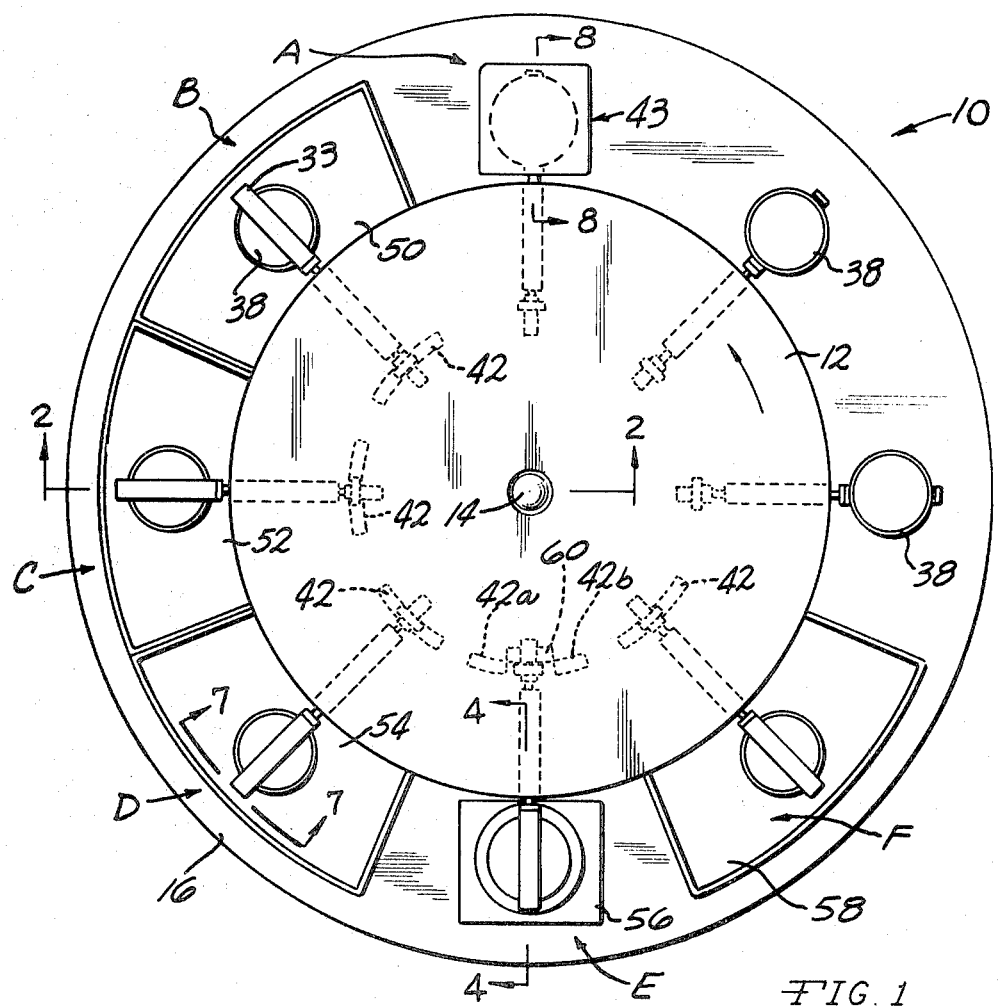
FIG. 1 is a plan view of the apparatus of this invention.
Figure 3:
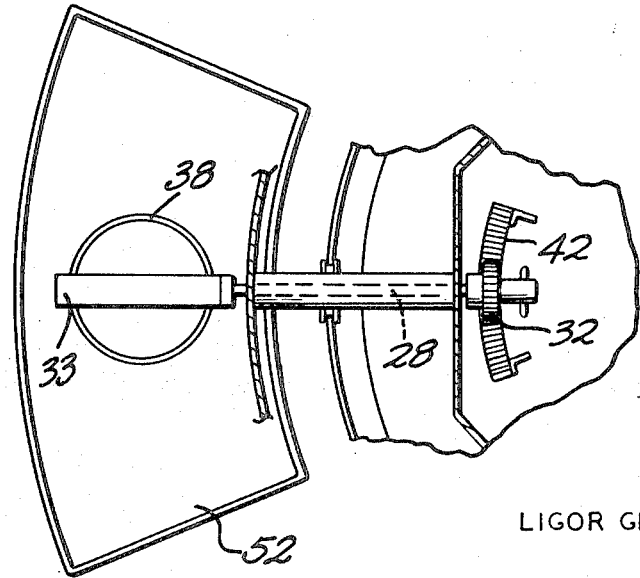
FIG. 3 is a fragmentary sectional view of a portion of the apparatus of this invention as seen from substantially the line 3—3 of FIG. 2.

With reference to the drawing, the apparatus of this invention, indicated generally at 10, is illustrated in FIGS. 1 and 2 as including a substantially flat horizontal table 12 secured to an upright rotatable shaft 14 which is bearing supported on a main frame 16 for rotation about a vertical axis. A motor 18 is drive connected through a sprocket and chain assembly 20 to the shaft 14 for rotating the shaft. Adjacent its periphery, the table 12 carries rollers 22 which are guidably supported on a circular track 24 carried by the main frame 16. The rollers 22 thus provide additional support for the table 12.

A plurality of basket support assemblies 26, illustrated as being eight in number, are carried by the table 12. Each assembly 26 (FIG. 2) consists of a horizontal shaft 28 supported in bearings 30 carried by the table 12 and positioned so that the shaft 28 extends substantially radially of the table 12. At its inner end, the shaft 28 carries a spur gear 32 and at its outer end the shaft 28 is connected to a generally U-shape bracket 33. The bracket 33 includes upright legs 34 each of which is provided with an upright slot 36 (FIG. 7). A perforated basket 38 carries oppositely extending stub shafts 40 which extend into the slots 36 so as to support the basket 38 on the legs 34 for pivotal movement about the stub shafts 40. As shown in FIG. 7 the slots 36 are positioned to one side of the shaft 28. As a result, when the bracket 32 is moved, as shown in FIG. 2, from a position in which the arms 34 extend upwardly to a position in which the arms 34 extend downwardly, the basket 38 will be lowered by the amount shown in FIG. 2. In order to accomplish movement of the arms 34 between the positions illustrated in FIG. 2, arcuate racks 42 are mounted on the main frame 16 for cooperation with the gears 32 in a manner to be described presently.

At one point on the periphery of the table 12 a spaghetti-loading unit 43 (FIG. 8) is positioned so that the discharge end 44 of the unit 43 will be positioned above a basket 38. The discharge end 44 is aligned with and is of the same cross-sectional shape as the basket 38. The unit 43 includes a valving mechanism 45 which is operable to deposit a predetermined volume of spaghetti in the basket 38. The mechanism 45 consists of two flat valve plates 46 and 47 which are movable by air-operated piston and cylinder assemblies 46a and 47a, respectively, between the extended positions shown in FIG. 8 and retracted positions to one side of unit 43. The space in unit 43 between the plates 46 and 47 defines a basket load of spaghetti, namely, a serving portion. Between loading operations plate 47 is in the position shown closing discharge end 44 of unit 43 and plate 46 is retracted. When a basket 38 is to be loaded, plate 46 is extended to the position shown in FIG. 8 and plate 47 is retracted so that spaghetti between the plates drops into a basket 38. The cylinder assemblies 46a and 47a are then automatically operated to reverse the plate positions in readiness for the next loading operation.

For convenience of description, the load station is designated as station A. Adjacent station A, a tank 50 is positioned on the main frame 16 and is filled with boiling water so as to define a final cook station B. A similar tank 52 is filled with a hot tomato sauce and defines a sauce station C. Another tank 54 on the main frame 16 defines a drip station D. Adjacent station D is a plate retention and positioning unit 56, of conventional construction, which defines a dispensing station E. A tank 58 of boiling water adjacent station E defines a wash station F.

In operation of the apparatus 10, the motor 18 is operated intermittently to move the table 12 through a 45° angle and then remain off for a predetermined time period. Assume that one of the container support assemblies 26 is positioned so that the basket 38 thereon is positioned below the discharge end 44 for the spaghetti-loading unit 43 at station A. The valve mechanism 45 is operated to deposit a predetermined volume of precooked spaghetti, corresponding to one serving of spaghetti, in the basket 38. The motor 18 is then operated to rotate the shaft 14 so as to move the table 12 in a counterclockwise direction as viewed in FIG. 1 and thereby move the support assembly 26 from station toward station B and move the next basket in line to station A. As the basket 38 reaches a position above the tank 50 at station B, the spur gear 32 on the shaft 28 engages one of the arcuate racks 42, which causes the shaft 28 to rotate, as seen in FIG. 7.

When the shaft 28 has rotated slightly more than 90°, to the position shown in broken lines in FIG. 7, the basket stub shafts 40 will slide downwardly in the slots 36 toward the opposite ends of the slots. When the shaft 28 is rotated 180°, the basket 38 will have dropped downwardly to the dotted line position shown in FIG. 2 in which the basket 38 will be within instead of above the tank 50. At such time, the table 12 has completed its movement so the motor 18 stops for a predetermined time period allowing the basket contents to become intimately exposed to the hot water in the tank 50. This results in a final cooking of the spaghetti in the basket 38.

The motor 18 is then again operated so as to rotate the table 12 causing the spur gear 32 to roll on the rack 42 through an angle of 180° to thereby return the arms 34 on the bracket 33 to their upwardly extending positions shown in FIG. 2. This returns the basket 38 to a position above the tank 50 so that the basket 38 can move across the end of the tank 50 to a position above the tank 52. Subsequently, the gear 32 contacts a second rack 42 which causes the above-described cycle of lowering, stopping and then raising of the basket 38 to be repeated at the tank 52 which is filled with hot spaghetti sauce.

The above-described cycle is then repeated so as to move the basket 38 upwardly over the end wall of the tank 52 to a position above the tank 54 which is a drain tank. The lowering, stopping and then raising cycle is then repeated at station D to allow excess spaghetti sauce on the spaghetti in the basket 38 to drip off. During movement of the basket 38 between its positions illustrated in broken and solid lines in FIG. 2, the basket 38 swings back and forth about the shafts 40 and when the shafts 40 slide downwardly in the slots 36 and strike the arms 34 at the lower ends of the slots, the basket 38 is subjected to an impact force, all of which tends to shake excess sauce from the spaghetti in the basket. The stopping of the motor 18 while the basket 38 is at station D allows sauce to drain from the spaghetti.

When the motor 18 is again operated, the spur gear 32 is moved along the rack 42 for the station D so as to return the bracket arms 34 to upwardly extending positions in which the basket 38 is raised above the table 54. At station E, the rack 42 is separated into two spaced sections 42a and 42b, and a support flange 60, positioned radially inwardly of the sections 42a and 42b, is positioned so that it extends between adjacent ends of the sections. A pair of spring-pressed pins 62 are secured to the inner end of the shaft 28 at positions such that in one position of the shaft 28, illustrated in FIG. 6, the pins 62 will be in an inverted V-formation at positions engageable with the flange 60. Thus, at the release station E, engagement of the spur gear 32 with the rack segment 42a will provide for movement of the bracket arms 34 to their downwardly extending positions illustrated in FIG. 4. At such times, the pins 62 will engage the flange 60 and prevent further rotation of the shaft 28 so as to stabilize the bracket 33 in its inverted position in which the basket 38 is lowered to its broken line position shown in FIG. 5.

As illustrated in FIG. 4, the inner one of the basket stub shafts 40 is provided with a pair of actuating fingers 64 and 66 which are arranged in a V-formation. During the time that the pins 62 are sliding on the flange 60, the basket 38 is in its lowered position illustrated in FIG. 5 in broken lines and the actuating fingers 64 and 66 are in the position shown in broken lines in FIG. 5. At such time, abutment pins 68 and 70 carried on a bracket 72 secured to the main frame 16 are in position to intercept the fingers 64 and 66. As shown in FIG. 5, the finger 64 will first engage the pin 68, and during movement of the finger 64 past the pin 68 the basket 38 will be rotated in a clockwise direction as viewed in FIG. 5. Such movement will position the finger 66 at a location in which it will strike the pin 70 to further tip the basket 38 to thus move the basket 38 to an inverted position, such as the position shown in FIG. 4, following which the basket will immediately right itself. The basket contents, indicated at 76 in FIG. 4, then fall onto a plate 78 carried by the unit 56. The basket 38 remains in station E for the same time period that it remained at the other stations since the motor 18 is operated intermittently with equal time periods between subsequent operations.

When the motor 18 is again operated, table 12 is moved so as to slide the pins 62 on the flange 60 until the spur gear 32 engages the rack segment 42b which operates to rotate the bracket 33 to again raise the basket 38 to its elevated position shown in FIG. 2. The cycle of lowering and then raising the basket 38 is then repeated at station F at which a tank 58 of boiling water is located so that the basket 38 is subjected to the cleaning action of the boiling water in tank 58. From station F, the basket 38 goes through two "dwell" stations at which no action takes place.

A modified form of basket-inverting mechanism is illustrated in FIGS. 9 and 10 in which the fingers 64 and 66 on the shaft 40 are replaced by a cam follower 80 which can be a rubber member or an extension of shaft 40. A cam plate 82 has a cam slot 84 shaped to provide for rotation of follower 80 through a full circle of rotation so as to rotate basket 38 and invert it at station E.

It can thus be seen that when the motor 18 is operated to advance the basket 38 from one station to the next over a predetermined time interval, that single-serving portions of spaghetti can be continuously discharged at station E, with one discharge taking place each time interval. The spaghetti is removed from station E and subjected to a selected additional sauce treatment and then dispensed. Thus, uniformly processed food product is continuously obtainable from the apparatus 10.

What is claimed is:

1. Apparatus for continuously converting a cookable food product to a cooked and processed food product comprising a rotatable table, means defining a plurality of work stations around the periphery of said table, a plurality of basket supports mounted on said table and projecting outwardly therefrom to positions spaced vertically relative to said stations, a basket adapted to contain food product movably mounted on each of said supports, means operable to cause said baskets to be substantially inverted at least one of said stations and moved vertically at others of said stations, each of said basket supports including a rotatable shaft, upright spaced legs on said shaft, means rotatably supporting said basket on said legs, and coacting rack and gear means on said table and said basket supports operable to rotate said shafts in response to rotation of said table.

2. Apparatus according to claim 1 further including means forming slots in said legs, shaft means on each of said baskets extending into said slots in one of said basket supports for rotatable movement therein to invert said basket and for slidable movement therein to raise and lower said basket.

3. Apparatus according to claim 1 wherein said baskets are constructed of a perforate material.

4. Apparatus according to claim 1 wherein said coacting rack and gear means includes an arcuate rack corresponding to each station at which lowering of said basket is desired and a gear on each of said shafts located to mesh with said arcuate racks.

* * * * *